Dec. 19, 1933.        O. HENZE        1,940,593
FISHING REEL
Filed July 30, 1932
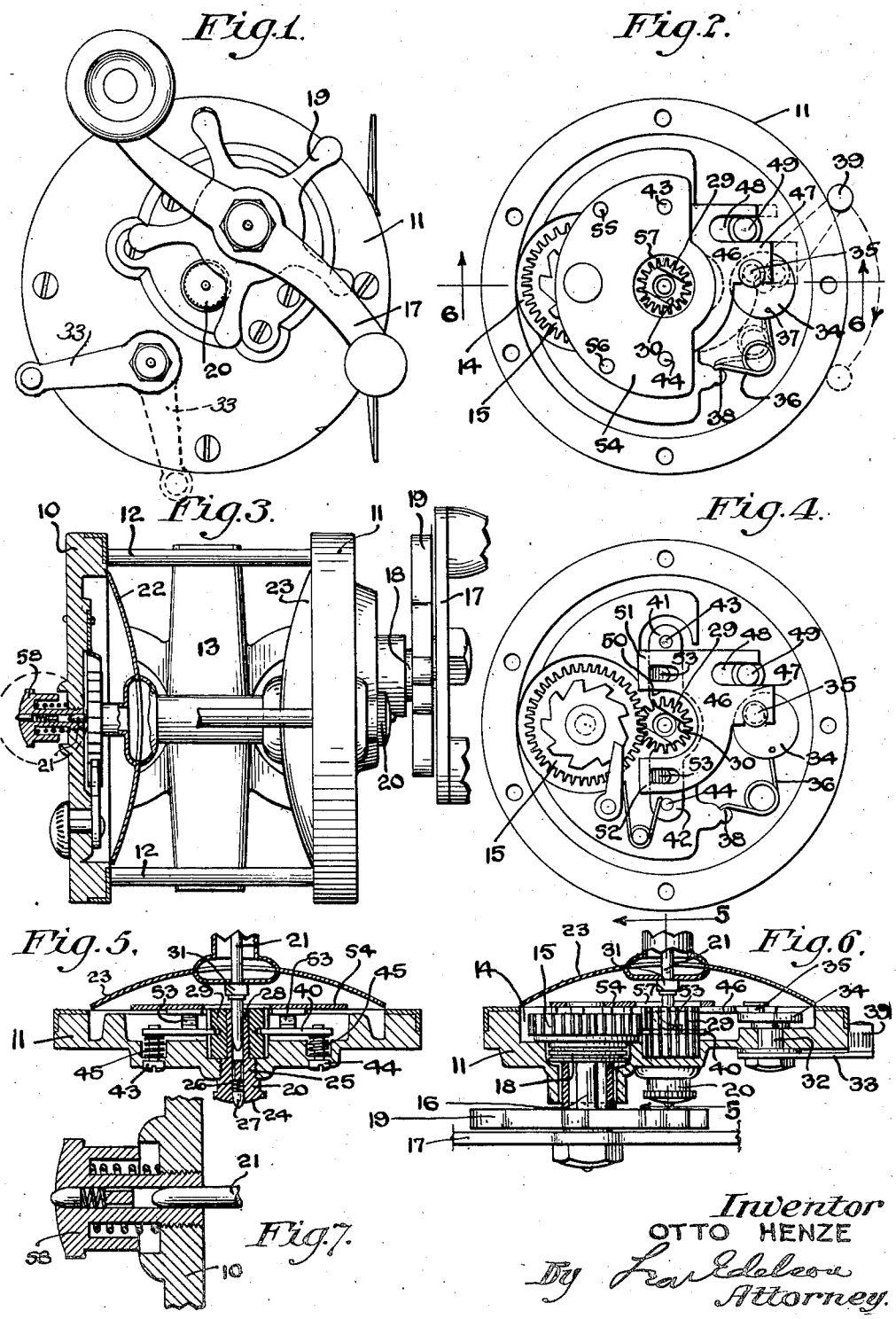
Inventor
OTTO HENZE
By *Edelson*
Attorney.

Patented Dec. 19, 1933

1,940,593

UNITED STATES PATENT OFFICE 1,940,593

FISHING REEL

Otto Henze, Philadelphia, Pa.

Application July 30, 1932. Serial No. 626,549

6 Claims. (Cl. 242—84.7)

This invention relates generally to improvements in fishing reels, more particularly that type known in the art as free-spool wheels, wherein mechanism is provided for disconnecting the reel shaft from the operating crank shaft in order that the spool itself may revolve freely with no friction or drag to overcome other than that produced by its own bearings.

Among the principal objects of this invention is to provide in a reel of the character above described a mechanism for readily shifting a driven gear axially into or out of engagement with the reel shaft or spindle, the said axially shiftable driven gear being constantly maintained in entrainment with a driving gear therefor which is operated by the externally arranged operating crank or lever.

Another object of the present invention is the provision of an improved mechanism for quickly and positively effecting the disconnection of the reel spindle from the crank shaft without, however, effecting the disentrainment of the gears interposed between the reel and the crank shaft.

A still further object of the present invention is the provision in a reel of the character described, of an externally arranged gear shift lever which is so operative that upon simple manipulation thereof it assumes one or another of two positive positions, one position of said gear shift lever being such as to effect a positive driving connection between the reel and crank shafts and the other of such positions being such as to effect the disconnection between said shafts.

Further objects of the invention, such as the provision of a free-spool reel which is exceedingly simple in construction, inexpensive to manufacture, efficient in operation and durable in use, will appear more fully hereinafter.

The invention consists substantially in the combination, construction, location and relative arrangement of parts, all as will appear more fully hereinafter, as shown in the accompanying drawing, and as finally pointed out in the appended claims.

In the said accompanying drawing:—

Figure 1 is an end elevational view of the reel constructed in accordance with and embodying the principles of the present invention;

Figure 2 is a view showing the inner surface of the right hand end plate of the reel;

Figure 3 is a side elevational view of the reel, a portion thereof being shown in vertical cross-section;

Figure 4 is a view corresponding to Figure 2 but with the gear cover plate removed;

Figure 5 is a sectional view taken on the line 5—5 of Figure 6;

Figure 6 is a sectional view taken on the line 6—6 of Figure 2; and

Figure 7 is an enlarged sectional view of the portion within the dotted circle of Figure 3.

Referring now more particularly to the drawing, it will be observed that the reel as constructed in accordance with and embodying the principles of the present invention comprises a pair of end plates or discs 10 and 11 which are secured together in the assembled relation shown by a plurality of pillars 12 and by a cross plate 13 to which latter the fishing rod (not shown) is adapted to be attached.

As appears most clearly in Figure 2, the end plate 11 is suitably recessed, as at 14, in its inner surface, to accommodate a main driving gear 15 the shaft 16 of which projects exteriorly of the end plate 11, the extremities of this shaft 16 being adapted to receive a suitable operating lever or handle 17 for imparting rotation to the main driving gear 15. Preferably interposed between the operating handle 17 and the main driving gear 15 is a drag unit 18 the adjustment of which may be effected by means of a suitably arranged star wheel 19. Although this drag unit forms no part of the present invention, it will be understood that by rotating the star wheel 19 in one direction or the other the amount of friction or drag between the operating handle 17 and the gear 15 may be adjusted to any desired degree so that, if desired, the spool may be unwound by a baited fish by overcoming the friction or drag in the handle. It will be understood that any suitable drag unit may be interposed between the operating handle 17 and the main driving gear 15.

Centrally provided in the end plate 11 is an interiorly threaded aperture within which is adapted to be threadedly secured an end bearing element 20 for one end of the reel spindle or shaft 21, the reel assembly of which the spindle 21 forms a part being shown most clearly in Figure 3 as comprising a pair of oppositely concaved end heads 22 and 23. The bearing element 20 is provided with a capped end 24 and a tubular shank 25, the inner portion of this tubular shank being provided with a smooth surface for a purpose which will be apparent immediately hereinafter. Extending axially through the capped end 24 of the bearing element is a bore 26 constituting an oil duct, the outer end of this oil duct being sealed by a spring-pressed oil seal 27.

The bearing element 20 is so designed that when threadedly secured in position in the end plate 11, the tubular shank 28 thereof projects interiorly of the end plate, the bore of this shank being adapted to receive one end of the reel spindle 21. Slidably mounted upon the interiorly projecting portion 28 of the tubular shank of the bearing element 20 and in mesh engagement with the main driving gear 15 is a second gear 29. This latter gear 29 is axially shiftable upon the tubular shank 28 of the bearing element 20 in such manner that it may be brought into and out of engagement with the reel spindle 21 without, however, effecting its disentrainment with respect to the main driving gear 15. In order to effect the positive engagement between the driven gear 29 and the spindle shaft 21, the said gear is provided with a diametrically extending notch 30 in the inner surface thereof for accommodating a correspondingly shouldered element 31 on the spindle 21.

The mechanism for effecting the axial movement of the driven gear will now be described, it being understood that this mechanism is employed to effect the disengagement of the driven gear from the spindle 21 in order to permit the reel assembly to be freely rotated relatively to the operating handle 17. To this end, there is provided in the end plate 11 a stub shaft 32 to the exteriorly projecting extremity of which is secured a gear-shifting lever 33. Secured to the inner extremity of the stub shaft 32 is a circular disc 34 provided with an eccentrically located headed pin 35. A spring 36, one end of which is secured to the circular disc 34, as at 37, and the opposite end of which abuts a suitable shoulder 38 provided therefor in the end plate 11 tends to maintain the circular disc in one position or another depending upon the direction of throw of the gear shift lever 33. It will be observed that this gear shift lever is provided with a laterally extending knob 39, which extends across and is adapted to engage the peripheral edge of the end plate 11 in such manner that when the gear shift lever is shifted in one direction or another, the spring 36 acts to snap the gear shift lever into one or the other of its two possible positions. By properly designing and balancing the spring 36, the gear shift lever will always assume one or the other of its extreme positions and never a position therebetween in consequence of which the driven gear is always either positively connected to the reel spindle or positively disconnected therefrom.

The driven gear 29 is rotatable within a yoke 40 having oppositely extending arms 41 and 42, the extremities of said oppositely extending arms of the yoke being respectively apertured to permit the free projection therethrough of the screws 43 and 44, these screws serving as guide pins for preventing angular displacement of the yoke but permitting bodily movement thereof axially with respect to the spindle 21. Embracing each of the screws or guide pins 43 and 44 is a coil spring 45, these coil springs 45—45 being respectively interposed between the inner surface of the end plate 11 and the oppositely extending arms of the yoke in such manner as to tend constantly to press the yoke axially away from the end plate 11 and toward the spool assembly, it being understood, of course, that the driven gear 29, being carried by the yoke, is thus likewise axially spring-pressed toward the spool assembly and into engagement with the shouldered end of the reel spindle 21.

In order to shift the yoke 40 and the driven gear 29 rotatably supported thereon against the action of the coil springs 45—45 and in a direction to effect the disengagement of the driven gear from the shouldered end of the spindle 21, a laterally shiftable plate 46 is provided. This latter plate 46 is of the form best shown in Figures 2, 4 and 6 and is provided with a slotted extension 47 adapted for connection with the headed eccentric pin 35 of the spring-pressed circular plate 34. The plate 46 is further provided with a slot 48 which cooperates with a pin or the like 49 fixed to or formed as an integral part of the end plate 11 for guiding the plate 46 along a substantially rectilinear path. The inner end of the plate 46 is notched, as at 50, so as to permit its free movement relatively to the driven gear 29 and so as to provide in effect a substantially U-shaped plate having the branches 51 and 52. Each of these branches is provided with a struck-out portion constituting a tongue or lug 53 the angle of inclination of each of which is such that when the plate 46 is shifted into the position shown in Figure 2 these lugs force the yoke 40 outwardly against the pressure exerted by the coil springs 45—45. On the other hand, when the plate 46 is shifted into the dotted line position shown in Figure 2, the struck-out lugs 53—53 thereof are disengaged from the yoke 40 and so permit the latter to shift inwardly due to the pressure of the coil springs 45—45 exerted thereagainst.

In order to maintain the laterally shiftable plate 46 in position for movement always in a given plane and also in order to maintain all of the aforementioned parts in assembled relation, an outer plate 54 is provided, the latter plate being secured in position preferably by the same screws 43—44 which serve as the guide pins for the yoke 40. Preferably, auxiliary screws 55 and 56 are provided for fixedly securing the plate 54 in position. This plate is apertured, as at 57, to permit the axial projection therethrough of the driven gear 29. Normally, when the gear shift lever 33 is thrown in a clockwise direction, that is, in the full-line positions shown in Figures 1 and 6, the driven gear assumes a position with the inner face thereof lying substantially in the plane of the laterally shiftable plate 46. In other words, in this position of the gear shift lever, the driven gear is shifted axially toward the outer side of the cover plate 54. On the other hand, when the gear shift lever is thrown in a counter-clockwise direction to assume the dotted line position shown in Figures 1 and 2, the driven gear is projected axially through the aperture 57 in the cover plate 54 for positive engagement with the shouldered end of the reel spindle 21.

Inasmuch as the construction of the opposite end of the reel, that is, the construction of the end of the reel associated with the end plate 10, forms no part of the present invention, a detail description thereof is not deemed necessary herein other than to point out that the said end plate 10 is also provided with a bearing element 58 in axial alignment with the opposed bearing element 20 for accommodating the opposite end of the reel spindle 21. The construction of the bearing elements 20 and 58 are more particularly described and claimed in my copending application Serial No. 626,548, filed July 30th, 1932, to which reference is herein made.

From the foregoing, it will be apparent that the gear shift lever 33 is adapted to be shifted in either a clockwise or counter-clockwise direction and through the intervention of the eccentric pin 150

35, the laterally shiftable U-shaped plate 46 and the spring-pressed yoke 40 is adapted to effect the axial movement of the driven gear 29 out of or into engagement with the reel spindle 21. Furthermore, due to the provision of the spring 36 acting upon the circular plate 34 and through it upon the gear shift lever 33, the latter is forced to assume one of two definite extreme positions and never a position therebetween. In consequence of this, the reel assembly is either positively connected to the operating handle 17 or it is positively disconnected therefrom and accordingly there is little or no likelihood of the reel being injured or improperly functioning due to a partial connection between the reel assembly and the operating handle.

It will be understood, of course, that the invention is susceptible of various changes and modifications from time to time without departing from the real spirit or general principles of the invention and it is accordingly intended to claim the same broadly, as well as specifically, as indicated by the appended claims.

What is claimed as new and useful is:—

1. In a fishing reel, in combination, a pair of end plates, a spool rotatable therebetween, a pinion rotatably mounted in one of said end plates and arranged for axial movement into and out of driving connection with said spool, a spring-pressed yoke operatively associated with said pinion for urging the latter into driving connection with said spool, a plate overlying said yoke and having means adapted to depress the latter when said plate is shifted along a substantially rectilinear path extending in a direction normal to the axis of the spool, and means arranged exteriorly of the reel for effecting the required rectilinear movement of said plate.

2. In a fishing reel, in combination, a pair of end plates, a spool rotatable therebetween, a pinion rotatably mounted in one of said end plates and arranged for axial movement into and out of driving connection with said spool, a spring pressed plate engaging said pinion and having arms extending oppositely from the pinion, said plate being adapted to shift said pinion axially, a second plate overlying said first-mentioned plate and in embracing relation with respect to said pinion, said second plate being provided with cam elements for respectively engaging the oppositely directed arms of the first-mentioned plate, means for shifting said second plate along a rectilinear path and in the plane thereof whereby said cam elements operate to shift the first-mentioned plate and the pinion engaged therewith in a direction normal to the plane of the second-mentioned plate, and means for insuring a rectilinear movement of said second-mentioned plate.

3. In a fishing reel, in combination, a pair of end plates, a spool rotatable therebetween, a pinion rotatably mounted in one of said end plates for movement axially with respect to said spool, coacting means on said pinion and spool for effecting a driving connection therebetween, a main driving gear constantly entrained with said pinion for imparting rotation thereof, and a spring-pressed lever arranged exteriorly of said end plate and adapted to be snapped into one or the other of two extreme positions whereby to shift said pinion either into or out of driving engagement with said spool.

4. In a fishing reel, in combination, a pair of end plates, a spool rotatable therebetween and provided with a spindle having freely projecting opposed ends, a pinion rotatably mounted in one of said end plates and arranged for axial movement relatively to one end of said spindle, a lever pivoted to said end plate, means intervening said lever and pinion for effecting its axial movement upon operation of said lever, and spring means for throwing said lever in one or the other of two extreme positions whereby to insure the pinion being either positively engaged with or positively disengaged from said spool.

5. In a fishing reel, in combination, a pair of end plates, a spool rotatable therebetween, a pinion journalled in one of said end plates for effecting the rotation of said spool, a main driving gear also journalled in the said end plate for driving said pinion, an oscillatory lever having a shaft journalled in the said end plate and adapted when thrown in one direction to effect a driving connection between the main driving gear and the spool through said pinion, said lever being adapted, when thrown in the opposite direction, to break the said driving connection between the main driving and the spool whereby to render the driving gear ineffective to rotate the spool, and spring pressed means disposed interiorly of the said end plate for snap-throwing said lever to the full limit of its movement in one direction or the other.

6. In a fishing reel, in combination, a pair of end plates, a spindle journalled therebetween, a spool carried upon said spindle for rotation therewith, an operating handle for the reel, a pair of gears arranged for movement relatively to each other to effect a driving connection between said operating handle and said spindle, an oscillatory lever having a shaft journalled in one of said end plates, a pin disposed eccentrically upon the inner end of said shaft and having means operatively associated therewith to effect the movement of one of said gears relatively to the other whereby, when said lever is shifted in one direction or the other, the said handle is rendered either operative or inoperative to rotate said spindle, and spring pressed means interposed between the inner end of said shaft and a fixed point on said end plate to automatically snap-throw said lever in either direction to one or the other of opposite limits of travel upon shifting said lever beyond a point substantially midway of said limits.

OTTO HENZE.